(12) United States Patent
Sundström et al.

(10) Patent No.: US 6,849,220 B1
(45) Date of Patent: Feb. 1, 2005

(54) METHOD FOR PRODUCING POLYMER ROTORS

(75) Inventors: Mats Sundström, Ingarö (SE); Karlis Timuska, Stockholm (SE)

(73) Assignee: Sevenska Rotor Maskiner AB, Stockholm (SE)

(*) Notice: Subject to any disclaimer, the term of this patent is extended or adjusted under 35 U.S.C. 154(b) by 484 days.

(21) Appl. No.: 10/089,868

(22) PCT Filed: Oct. 16, 2000

(86) PCT No.: PCT/SE00/01998

§ 371 (c)(1),
(2), (4) Date: Apr. 4, 2002

(87) PCT Pub. No.: WO01/28746

PCT Pub. Date: Apr. 26, 2001

(30) Foreign Application Priority Data

Oct. 18, 1999  (SE) .............................. 9903772

(51) Int. Cl.[7] .......................... B29C 39/10; F04C 18/16
(52) U.S. Cl. .................. 264/273; 264/259; 264/271.1; 264/275; 264/279; 264/279.1
(58) Field of Search ................ 264/241, 259, 264/271.1, 273, 275, 279, 279.1; 425/127

(56) References Cited

U.S. PATENT DOCUMENTS 4,761,124 A * 8/1988 Timuska et al. ............ 418/153
5,672,365 A * 9/1997 Ishii et al. .................. 425/127

FOREIGN PATENT DOCUMENTS

| DE | 39 03 067 A1 | | 8/1990 |
|---|---|---|---|
| JP | 61-42249 | * | 2/1986 |
| JP | 2-279317 | * | 11/1990 |
| JP | 3-248820 | * | 11/1991 |
| JP | 6-170862 | * | 6/1994 |
| SE | 503 730 C2 | | 8/1996 |
| WO | WO 89/09881 | | 10/1989 |
| WO | WO 93/04811 | | 3/1993 |

* cited by examiner

Primary Examiner—Melvin C. Mayes
(74) Attorney, Agent, or Firm—Frishauf, Holtz, Goodman & Chick, P.C.

(57) ABSTRACT

The invention relates to a method of manufacturing a rotor (12) for a helical screw machine that includes a metal shaft (2) and helical lobes (9) mutually separated by intermediate grooves (13), comprising the steps of providing the shaft (2) with a blind axially extending passageway (10); connecting the passageway (10) with the barrel surface of the shaft (2) by means of at least one channel (11) extending outwardly from the shaft; inserting the rotor shaft (2) in a mold (1) that includes two mutually spaced end-walls (4, 5) which have respective rotor shaft receiving openings (6 and 7), said openings (4, 5) embracing the rotor shaft (2, 19) at least in a generally sealing fashion; heating the mold (1) and the shaft (2) to the curing temperature of the polymer; delivering polymer-forming materials to the mold (1); maintaining the barrel wall (3) of the mold (1) at said curing temperature until the polymer has cured; and removing the rotor from the mold (1). The method is characterized by the further steps of disposing the outwardly extending channel (11) on the shaft (2) such that said channel will be located generally in the middle of the mold (1) when the shaft (2) is inserted therein; and pressing the polymer into the axially extending passageway (10) at an overpressure of at least 1 bar.

9 Claims, 2 Drawing Sheets

METHOD FOR PRODUCING POLYMER ROTORS

The present invention relates to a method of manufacturing a polymeric rotor that includes a metal shaft having anchored thereon a polymeric body with helical lobes mutually separated by intermediate grooves, for a helical screw machine, such as a helical screw compressor and helical screw expander.

Rotors for helical screw machines include a metal shaft that has a rotor body affixed thereto. This rotor body has helical lobes mutually separated by grooves. Metal rotors are conventionally produced in one piece, whereas polymeric rotors have a metal shaft to which there is affixed a polymeric rotor body. The rotor body has at least two lobes, normally 4–7 lobes. A helical rotor machine will normally includes two mutually co-acting rotors, of which one rotor is a male rotor with typically relatively strong lobes, and the other rotor is a female rotor which normally has relatively weaker lobes. The rotor body surrounding the metal shaft is a coherent body in which the grooves separating the lobes have only a small material thickness, particularly in respect of a female rotor.

DE-A1-39 03 067 teaches the manufacture of a rotor for helical screw machines. According to this publication, a metal shaft is placed vertically in an open top matrix, whereafter a liquid polymer is either delivered to the outside of the shaft or through a passageway in the centre of the shaft, wherein channels extend radially to the shaft periphery from the lower end of the passageway. These channels open into the matrix at the lower end of the cavity to be filled with the liquid polymeric material. It is stated in the publication that this latter alternative is to be preferred when casting female rotors, that is to say female rotor bodies, of small thickness in the grooves between the lobes of the rotor. These radially extending channels open into the lower part of the cavity that has the smallest outer diameter.

When the polymer is delivered through the central passageway in the metal shaft in accordance with this publication, it is necessary that the polymer remains liquid in the lower part of the mould throughout the time taken to fill the mould completely. It is not until this has been achieved that conditions can be applied which cause the polymer to transform to a solid state in the lower part of the mould.

It has been found that rotors produced in this way have a smaller diameter in the centre of the rotor than at the ends thereof. The contraction or shrinkage that results in this hourglass shape may be due to the solidification of the polymer at a lower temperature at the ends of the rotor than at its centre. The higher temperature in the centre of the rotor results in more pronounced shrinkage.

An object is to provide a method of manufacture that eliminates the drawbacks associated with the known method and therewith obtain rotors that do not have a waisted centre part in an axial direction.

In accordance with the present invention, a polymeric rotor for a helical screw machine that includes a metal shaft and at least two helical lobes mutually separated by intermediate grooves is manufactured by providing the shaft with an axially extending blind passageway, connecting the axially extending passageway with the barrel surface of the shaft by means of at least one radially extending channel, inserting the metal shaft in a mould comprising two mutually spaced end walls that include mutually opposed central openings that receive the rotor shaft, said openings sealingly enclosing the metal shaft at least generally, heating the mould and the metal shaft to the polymer curing temperature, delivering polymer-forming materials to the mould, maintaining the mould and the metal shaft at said curing temperature until the polymer has been cured, and then removing the metal shaft with rotor from the mould. The inventive method is characterised in that the radial channel extending outwards from the passageway is arranged in a manner such that said channel will be situated generally in the middle of the mould when the shaft is inserted thereinto, and in that the polymer is pressed into the axially extending passageway at an overpressure of at least 1 bar.

Preferred embodiments of the method will be apparent from the dependent claims. The polymer material, release agent, and filler may be those described in the German reference or other materials known to the person skilled in this art.

According to one preferred embodiment of the invention, the metal shaft includes helical recesses or grooves that are filled with polymeric material and that form a sunken part of the outwardly lying lobe. The recesses or grooves will preferably have a parallel trapeziumn cross-section, with the shorter of the parallel sides located nearest the shaft periphery and extending perpendicularly to the shaft radius. The corners at the transition from the non-parallel sides to the shaft periphery are rounded, to reduce the fracture tendency of the polymeric material.

The helical grooves may extend along the full length of the lobe or solely along a part thereof. Similarly, the helical grooves may be two or more along part-grooves disposed along the same helical line. In this latter case, it is preferred that an outwardly directed channel opens into each part-groove.

According to the invention, the term metal alloys includes, for instance, steel and brass, wherewith steel is particularly preferred. The polymeric material may be polyurethane containing inorganic filler, for instance silicate-containing fibres.

The invention will now be described by way of example and with reference to the accompanying drawing, in which FIG. 1 is a schematic longitudinal section view of a mould according to the invention and shows a metal shaft inserted in the mould;

Figure 1:
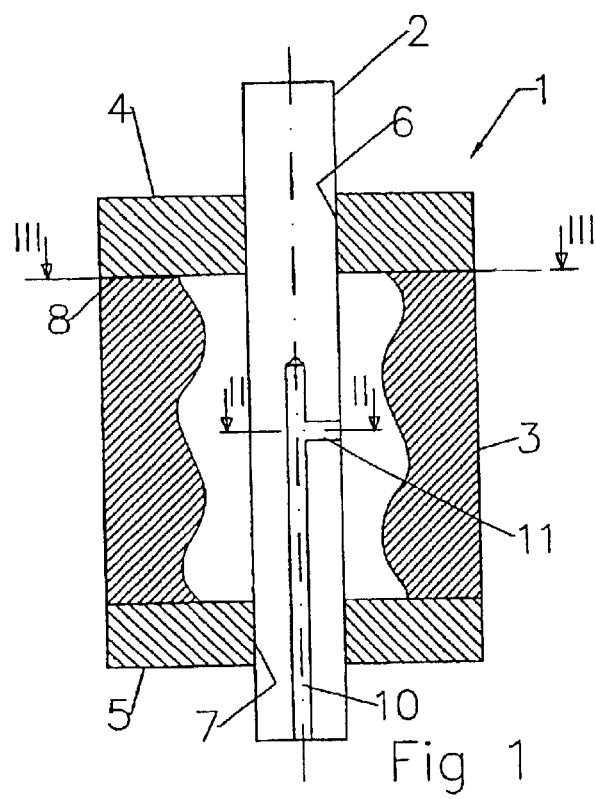
Figure 3:
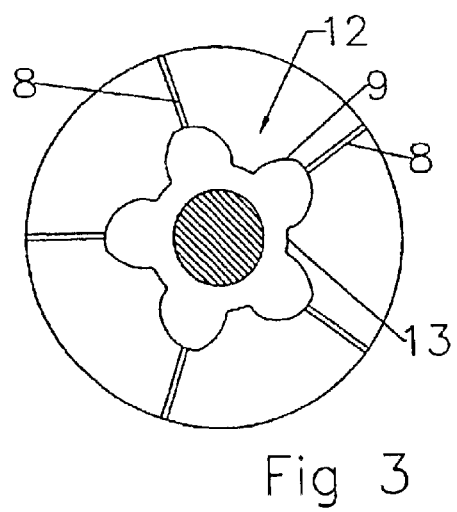
FIG. 3 is a sectional view of a first form of a known rotor end profile, taken on the line III—III in FIG. 1.

FIG. 1 shows a mould 1 in which a metal shaft, preferably a steel shaft 2, is inserted. The barrel wall 3 of the mould 1 has a cylindrical outer surface and internally the outer contour of a helical rotor, which in the illustrated case includes five lobes and an equal number of intermediate grooves, as shown in FIG. 3. The mould 1 includes an upper circular end-wall 4 and a lower circular end-wall 5. Each of the end-walls 4, 5 is provided with a respective central, shaft-receiving opening 6 and 7. The openings 6, 7 embrace the rotor shaft 2, such as to at least generally seal against said shaft. The mould includes in the upper part of the barrel wall 3 an air vent 8 for each rotor lobe 9, as will be seen from FIG. 3. These air vents 8 may also be disposed as grooves in the upper end-wall 4.

The rotor shaft 2 has at its lower end a central, axially extending passageway 10 that extends more than half way into the shaft 2. As will be seen from FIG. 1, those end-parts of the shaft 2 that are located outside the end-walls 4, 5 are of equal lengths. If the shaft 2 is placed asymmetrically in the mould 1, the length of the axial passageway will extend beyond the centre of the mould 1 surrounding the shaft.

At least one radial channel 11 extends to the periphery of the shaft 2 from the passageway 10. The number of radial channels 111 extending from the axial passageway to the periphery of the shaft will preferably equal the number of lobes 9 to be provided on the rotor. These radial channels 11 are preferably offset relative to each other in the axial direction of the shaft, so as to reduce or minimise weakening of the shaft in the region of said channels 11.

Figure 2:
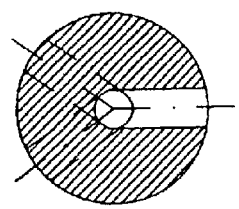
FIG. 2 is a sectional view of the metal shaft, taken on the line II—II in FIG. 1.

FIG. 2 shows the shaft 2 and one such radial channel 11 and two further channels 11' and 11" shown in broken lines, these further channels being located beneath the surface of the section. Although not shown, the shaft includes a further two radial channels 11 above the section surface.

FIG. 3 illustrates an end section of a male rotor 12 that has five lobes 9. These lobes 9 are mutually separated by grooves 13. It will be apparent from this Figure that the mould has five air vents 8 in its upper part.

Figure 4:
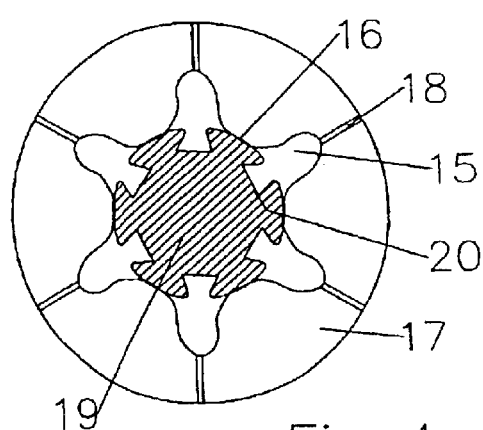
FIG. 4 is a sectional view of a second embodiment of a rotor end profile, taken on the line III—III in FIG. 1.

FIG. 4 is an end section of a female rotor 14 that has six lobes 15 and six intermediate grooves 16, said rotor being inserted in a mould 17. The rotor is formed in accordance with the invention. The rotor body 14 is disposed on a steel shaft 19 and has the form of six individual and mutually separated lobes 15. It will be seen from the Figure that the bottoms of respective grooves 16 between the lobes 15 are formed by the steel shaft 19. The lobes 15 are thus not mutually connected by polymeric material as in the case of the lobes 9 of the male rotor shown in FIG. 3. The mould includes six air vents 18. The rotors produced in accordance with FIGS. 3 and 4 are not intended to interact with each other.

As will be seen from FIG. 4, the shaft 19 includes recesses 20 that are trapezoidal in cross-section, wherewith the longer of the mutually parallel surfaces face towards the centre point of the shaft 19. The non-parallel surfaces have rounded corners at the shaft periphery. These trapezoidal recesses 20 widen in the same helical shape as the outwardly lying lobe 15. In one preferred embodiment of the invention, each radial channel 11 (FIG. 2) opens into one such recess 20. The recesses 20 widen from the radial channel 11 over a longer or shorter distance. In the case of the embodiment shown in FIG. 4, the recess 20 has the same length as the lobe 15. These recesses 20 are effective in the affixment of the polymer in the shaft 19. The rounded corners at the periphery of the shaft 19 reduce the risk of crack formation and lengthen the useful life of the rotor.

Figure 5:
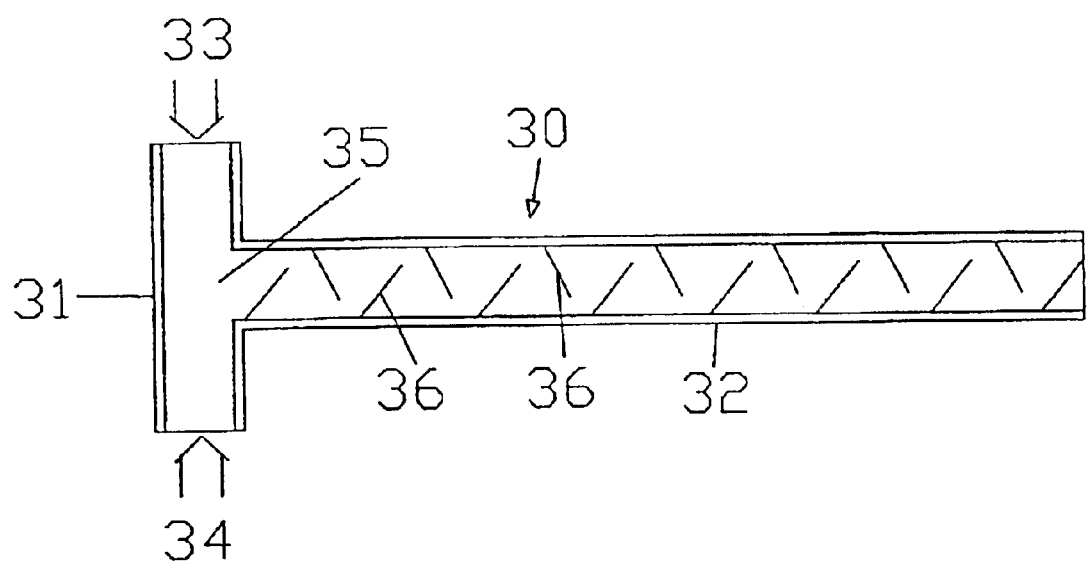
FIG. 5 is a schematic vertical sectional view of a static mixer.

FIG. 5 is a schematic vertical sectional view of a static mixer 30 for use in moulding inventive polymeric rotors. The mixer 30 includes a first conduit 31 that has two inlet openings 33, 34 at respective ends thereof. A third opening 35 that connects with one end of a second conduit 32 is provided in the conduit wall between said openings 33, 34. This second conduit includes a number of mixing elements 36, which may be helically shaped. The elements 36 are arranged to prevent material passing axially through the second conduit 32 without mixing. Such static mixers are known to the art.

According to the invention, a liquid or solid polymeric material, e.g. polyurethane, preferably containing filler, is delivered to the axially extending, central passageway 10 at a temperature of about 30° C. and at an overpressure of at least about 1 bar and at most about 15 bar. The preferred pressure lies about midway of this pressure range. The mould 1 and the shaft 2 have been heated to a temperature of about 90° C. A release agent may have been applied to the inner surface of the mould 1 prior to delivering the polymeric material. The barrel 3 of the mould is also heated electrically so as to maintain a temperature of about 90° C., this being done conventionally. The shaft 2 and the end-walls 4, 5 of the mould have a high thermal capacity and are therefore not heated. The polymeric material delivered to the axially extending passageway 10 leaves said passageway through the radially disposed channels 11.

The material exiting from the radial channels 11 first flows down in the upstanding mould 1 and thereafter rises in the mould cavity until the mould has been filled. Because the material delivered has a much lower temperature than the shaft 2 and the mould 1, the material will take up heat as it is delivered, while cooling the shaft 2 and the non-heated end surfaces. Because the material is delivered centrally in the mould 1, the material will be located where the lowest temperature prevails at the beginning of the solidification process. The fact that the material is delivered under a relatively high overpressure in precisely the centre of the mould 1, shrinkage of the polymer, normally occurring in the centre, is compensated for so that the rotor will not have a smaller diameter in the midway zone of the rotor than the diameter of the ends of the rotor.

According to a second embodiment of the invention, a static mixer 30 is placed in the central passageway 10. The length of the second conduit 32 of the static mixer is such that when the mixer is inserted it will only reach as far as the radially extending channels that lie nearest the orifice of the central passageway. This enables two components that together form the polymer after being cured to be delivered through a respective opening 33, 34 of the static mixer 30, said components passing through the opening 35 and into the second conduit 32 of the mixer. The components are mixed in the second conduit with the aid of the mixing elements 36, which induce lateral movement of the material.

What is claimed is:

1. A method of manufacturing a rotor for a helical screw machine that includes a metal shaft and helical lobes mutually separated by intermediate grooves, said metal shaft having a barrel surface, comprising the steps of providing the shaft with a blind axially extending passageway;

connecting the passageway with the barrel surface of the shaft by means of at least one outwardly extending channel such that said at least one channel is located generally in the middle of the mould when the shaft is inserted therein;

inserting the rotor shaft into a mould that includes a barrel wall and two mutually spaced end-walls that include respective rotor shaft receiving openings, said openings embracing the rotor shaft at least in a generally sealing fashion;

heating the mould and the shaft to the curing temperature of the polymer;

pressing polymer forming materials into the axially extending passageway at an over pressure of at least one bar to deliver polymer-forming materials to the mould;

maintaining the barrel wall of the mould at said curing temperature until the polymer has cured; and removing the rotor from the mould.

2. A method according to claim 1, further comprising providing the rotor shaft with a radially extending channel for each lobe, each of said channels being provided are disposed symmetrically around the circumference of the shaft.

3. A method according to claim 2, further comprising providing the channels offset relative to each other in the axial direction of the rotor shaft.

4. A method according to claim 2, further comprising positioning the shaft in the mould such that an outwardly directed channel opens into each lobe.

5. A method according to claim 2, further comprising providing the rotor shaft with helical recesses that have the same helical form as the lobes and that each intersect a respective channel.

6. A method according to claim 4, further comprising mixing the polymer forming material in the axially extending passageway.

7. A method according to claim 1, further comprising placing a static mixer in the central passageway and feeding a polymer-forming component through the opening of the mixer, and feeding a further polymer-forming component through the other opening.

8. A method according to claim 3, further comprising positioning the shaft in the mould such that an outwardly directed channel opens into each lobe.

9. A method according to claim 3, further comprising providing the rotor shaft with helical recesses that have the same helical form as the lobes and that each intersect a respective channel.

* * * * *